United States Patent [19]
Johnson

[11] Patent Number: 5,862,926
[45] Date of Patent: Jan. 26, 1999

[54] PICKUP LOADING HOIST

[76] Inventor: Clint Johnson, 497 Marshall Rd., New Richmond, Wis. 54017

[21] Appl. No.: 916,457

[22] Filed: Aug. 22, 1997

[51] Int. Cl.⁶ ...................................................... B60P 1/54
[52] U.S. Cl. ........................... 212/180; 414/542; 212/301
[58] Field of Search ............................ 414/542; 212/180, 212/302, 303, 304, 305, 306; 280/763.1

[56] References Cited

U.S. PATENT DOCUMENTS

| | | | |
|---|---|---|---|
| 2,177,525 | 10/1939 | Henderson | 414/542 |
| 2,289,366 | 7/1942 | Johnson | 414/542 |
| 2,504,232 | 4/1950 | Smith | 414/542 |
| 2,773,606 | 12/1956 | Sheperd | 414/542 |
| 2,927,704 | 3/1960 | Condon | 414/542 |
| 3,072,271 | 1/1963 | Costello | 414/542 |
| 3,863,782 | 2/1975 | Sandrock | 414/542 |
| 4,881,864 | 11/1989 | Amato | 212/180 |
| 4,930,970 | 6/1990 | Sunderland | 414/542 |
| 5,520,498 | 5/1996 | DiBartolomeo | 212/180 |

FOREIGN PATENT DOCUMENTS

| | | | |
|---|---|---|---|
| 425733 | 5/1991 | European Pat. Off. | 212/180 |

*Primary Examiner*—Thomas J. Brahan
*Attorney, Agent, or Firm*—Michael S. Neustel

[57] ABSTRACT

A pickup loading hoist for loading and unloading heavy cargo to and from a bed of a pickup without requiring physical exertion by the user and which can be easily disassembled into a compact storage position. The inventive device includes a front frame and a rear frame vertically aligned parallel to one another and removably attachable to the bed of the pickup, an I-beam secured traversely to the front and rear frames and extending a finite distance beyond the rear frame, a sliding member attached to the I-beam, and a winch for manipulating a chain with a hook.

4 Claims, 3 Drawing Sheets

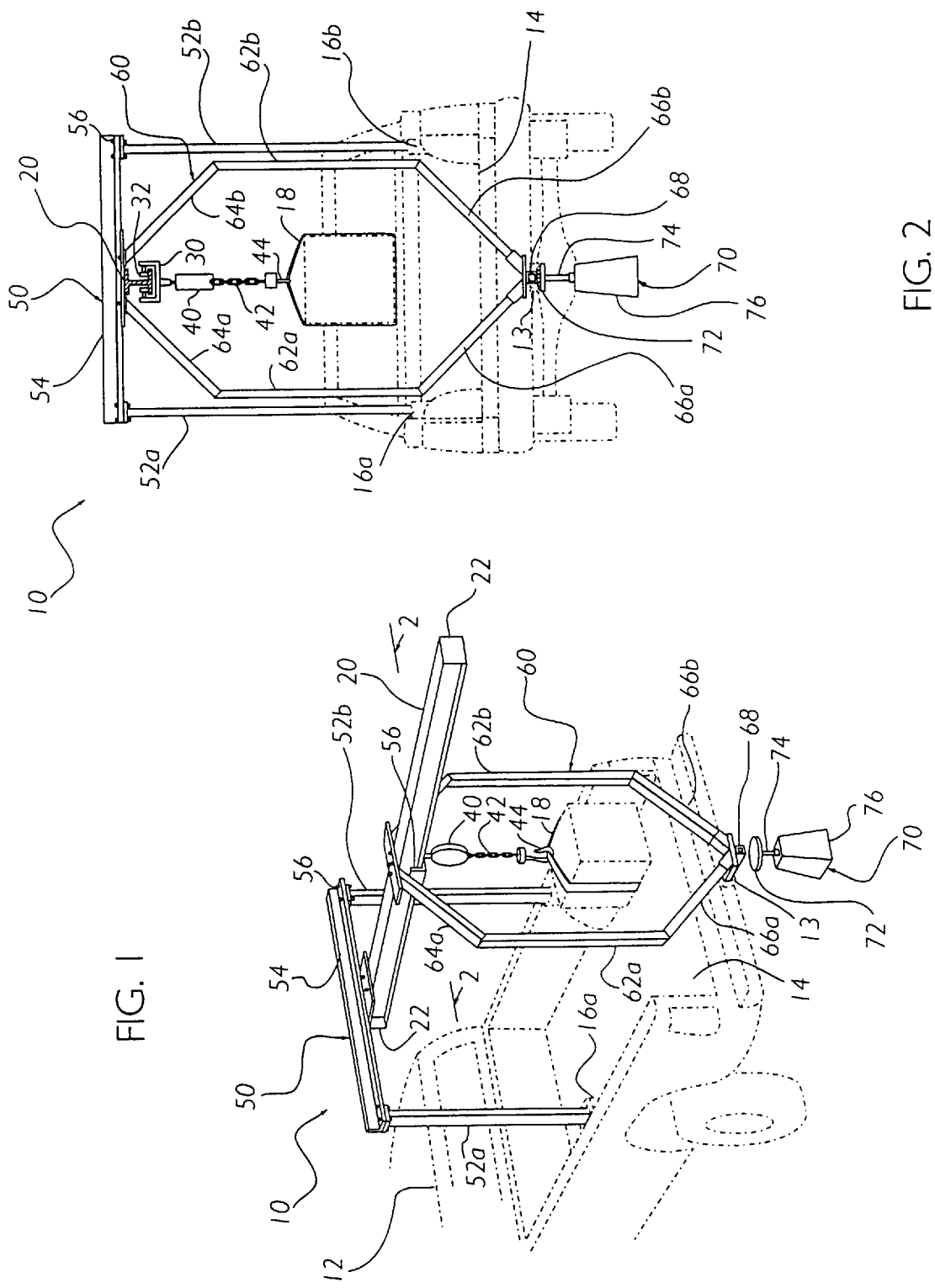

PICKUP LOADING HOIST

BACKGROUND OF THE INVENTION

1. Field of the Invention

The present invention relates generally to lifting devices for vehicles and more specifically it relates to a pickup loading hoist for loading and unloading heavy cargo to and from a bed of a pickup without requiring physical exertion by the user and which can be easily disassembled into a compact storage position.

2. Description of the Prior Art

There are numerous lifting devices for vehicles. For example, U.S. Pat. No. 3,794,192 to Monson; U.S. Pat. No. 4,746,263 to Cook; U.S. Pat. No. 4,383,792 to Seabloom et al; U.S. Pat. No. 4,979,865 to Strickland; U.S. Pat. No. 5,119,961 to Runn; U.S. Pat. No. 3,918,592 to Paul; U.S. Pat. No. 4,216,941 to Little; U.S. Pat. No. 2,481,223 to Johnson; U.S. Pat. No. 410,371 to Moore all are illustrative of such prior art.

Monson (U.S. Pat. No. 3,794,192) discloses a folding support frame for boxes of pickup trucks which can be used for supporting a chain hoist which will fold into a compact storage position on the top of the pickup box without any of the members interfering with the box capacity.

Cook (U.S. Pat. No. 4,746,263) discloses a telescoping hoist assembly comprising a boom telescoping into and out of a mast pivotally anchored at one end of the pickup bumper structure and a power winch operated by the pickup electrical energizer mounted on the outward end of the boom.

While these devices may be suitable for the particular purpose to which they address, they are not as suitable for loading and unloading heavy cargo to and from a bed of a pickup without requiring physical exertion by the user and which can be easily disassembled into a compact storage position. None of the prior art is capable of elevating heavy cargo toward a frontal portion of the bed of the pickup.

In these respects, the pickup loading hoist according to the present invention substantially departs from the conventional concepts and designs of the prior art, and in so doing provides an apparatus primarily developed for the purpose of loading and unloading heavy cargo to and from a bed of a pickup without requiring physical exertion by the user and which can be easily disassembled into a compact storage position.

SUMMARY OF THE INVENTION

A primary object of the present invention is to provide a pickup loading hoist that will overcome the shortcomings of the prior art devices.

Another object is to provide a pickup loading hoist that elevates a heavy object into a frontal portion of a pickup without damaging the bed of the pickup.

An additional object is to provide a pickup loading hoist that can be easily disassembled into a compact storage position.

A further object is to provide a pickup loading hoist that is constructed from a simple structure.

Another object is to provide a pickup loading hoist that is capable of extending outward from the bed of the pickup a finite distance to retrieve the cargo.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a rear upper perspective view of the present invention installed on the pickup.

FIG. 2 is a rear view of the present invention on the pickup.

DESCRIPTION OF THE PREFERRED EMBODIMENT

Figure 4:
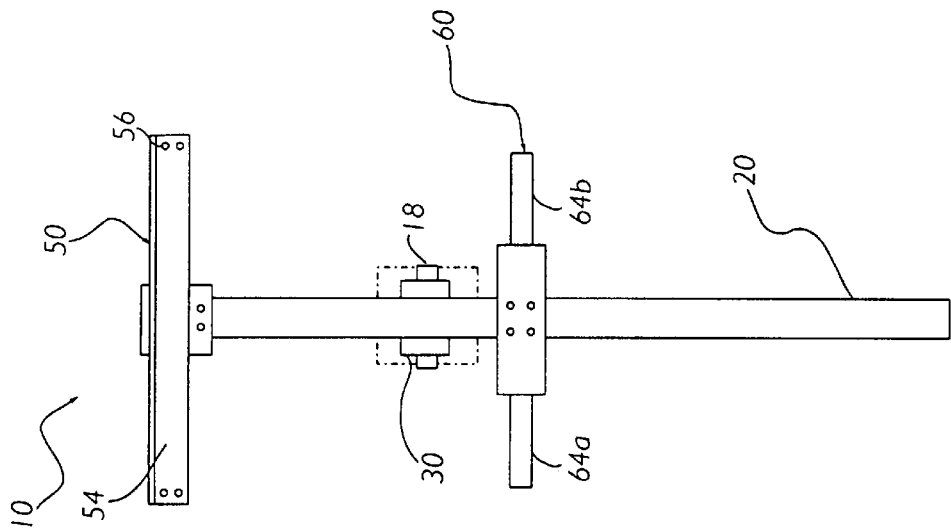
FIG. 4 is a top view of the present invention.
Figure 3:
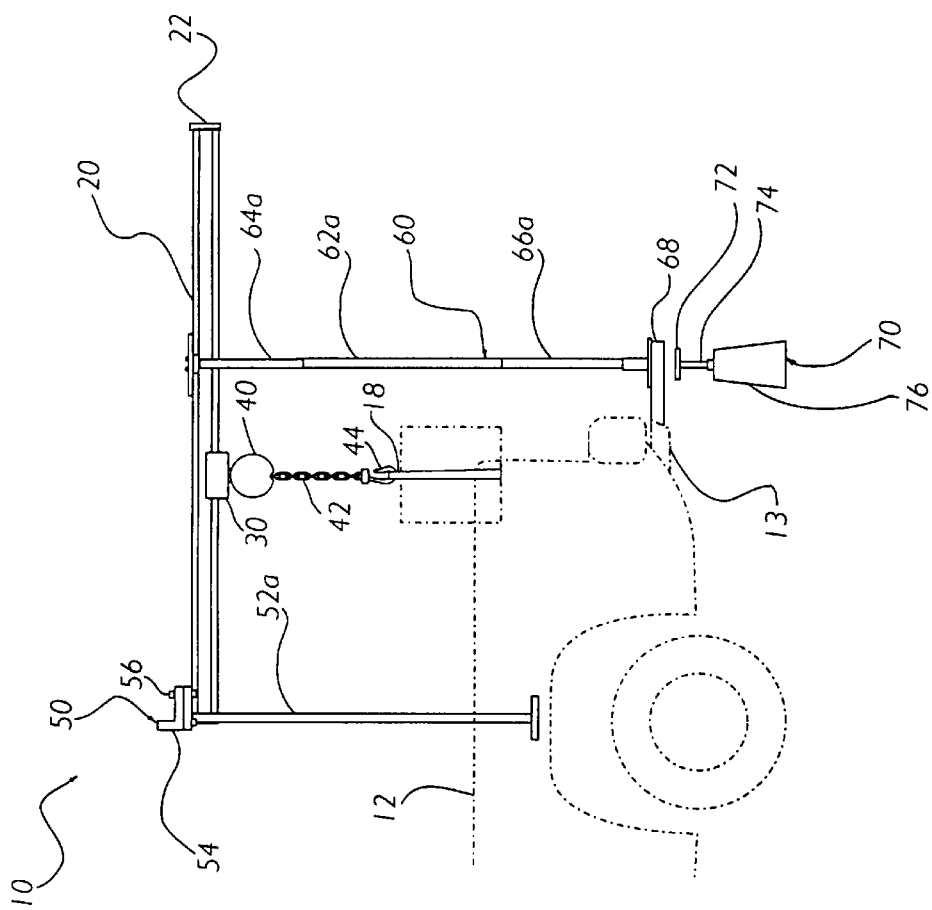
FIG. 3 is a side view of the present invention on the pickup.
Figure 5:
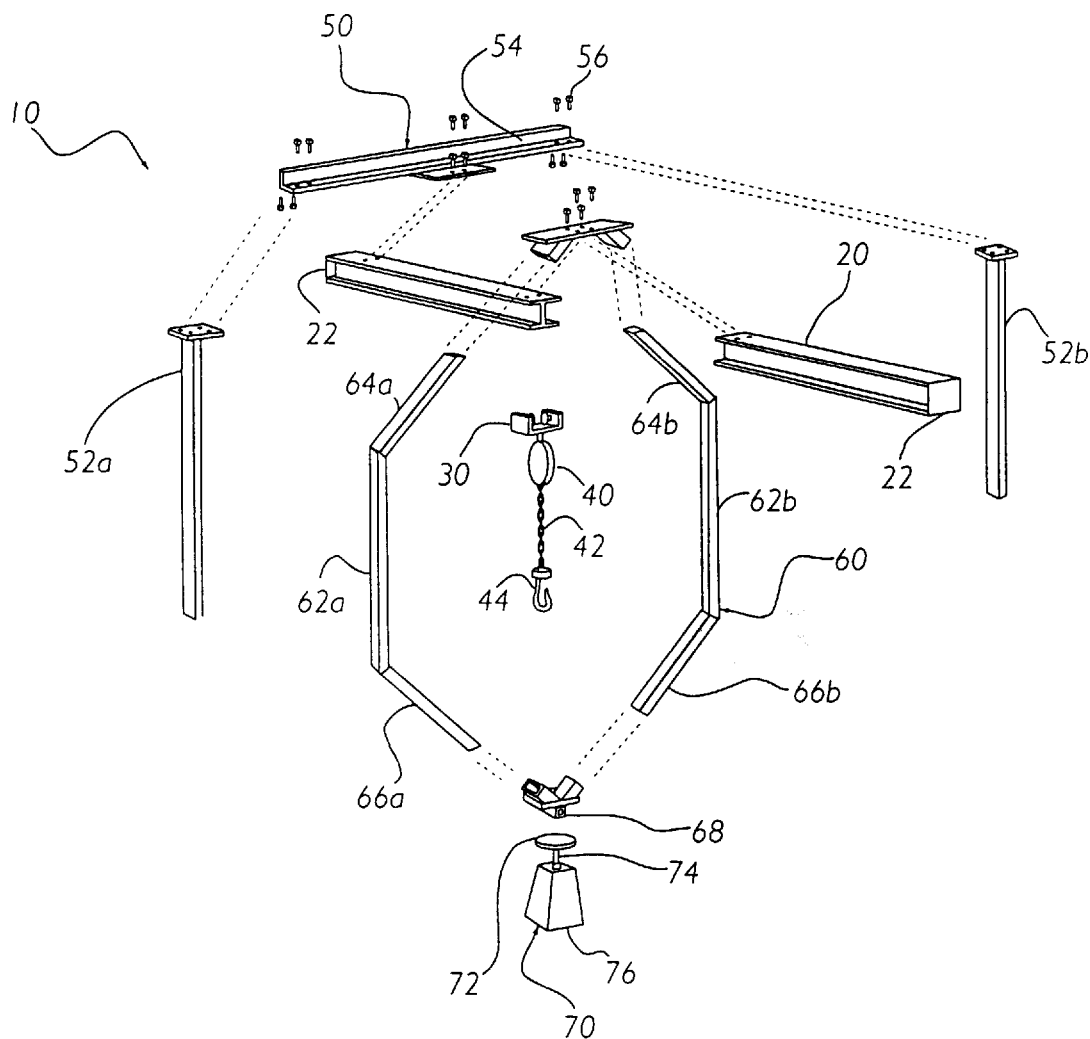
FIG. 5 is an exploded upper perspective view of the present invention.

Turning now descriptively to the drawings, in which similar reference characters denote similar elements throughout the several view, FIGS. 1 through 5 illustrate a pickup loading hoist 10, which comprises a front frame 50 and a rear frame 60 vertically aligned parallel to one another and removably attachable to the bed 14 of the pickup 12, an I-beam 20 secured traversely to the front and rear frames 50, 60 and extending a finite distance beyond the rear frame 60, a sliding member 30 attached to the I-beam 20, and a winch 40 for manipulating a chain 42 with a hook 44. The I-beam 20 includes a stopper 22 at each end to prevent the sliding member 30 from being removed. The sliding member 30 includes a plurality of rollers 32 for sliding upon the I-beam 20. The front frame 50, the rear frame 60 and the I-beam 20 are assembled utilizing conventional fasteners 56.

As best shown in FIG. 1 of the drawings, the front frame 50 is removably attachable to a pair of stake holders 16 in a central location of the bed 14. The front frame 50 comprises a pair of side members 52*a–b* parallel to one another and a cross member 54 secured between thereof as best shown in FIG. 1. The central portion of the cross member 54 engages and supports a front end of the I-beam 20.

As best shown in FIG. 2 of the drawings, the rear frame 60 includes a coupler member 68 for removably engaging a tubular hitch 13 within the pickup 12. The rear frame 60 comprises a pair of lower angled members 66*a–b* secured at one end to the coupler member 68 and projecting away from one another at an acute angle. A pair of vertical members 62*a–b* are attached to the pair of lower angled members 66*a–b* opposite of the coupler member 68 as shown in FIG. 2. A pair of upper angled members 64*a–b* are attached to the pair of vertical members 62*a–b* opposite of the pair of lower angled members 66*a–b*. The pair of upper angled members 64*a–b* engage the I-beam 20 thereby supporting a central portion of the I-beam 20.

As shown in FIGS. 1 and 2 of the drawings, a hitch support device 70 is positionable beneath and supporting the tubular hitch 13 while the winch 40 is transporting the cargo 18 into or from the bed 14 of the pickup 12. The hitch support device 70 comprises a base member 76 and a threaded shaft 74 threadably attached to the base member 76 and projecting vertically therefrom. As best shown in FIG. 1 of the drawings, a plate 72 is attached to an end of the threaded shaft 74 opposite of the base member 76 for engaging the tubular hitch 13 of the pickup 12 thereby reducing the amount of force applied to the frame of the pickup 12 supporting the tubular hitch.

In use, the front frame 50 is positioned within the pair of stake holders 16. The I-beam 20 is attached between the front frame 50 and the rear frame 60. The hitch support device 70 is positioned beneath and in engagement with the tubular hitch 13 of the pickup 12. The sliding member 30 is manipulated so as to be positioned near a rear portion of the I-beam 20. The winch 40 is manipulated to lower the chain 42 and hook 44. The hook 44 is engaged to the cargo 18 to be loaded and then the winch 40 is manipulated to elevate the cargo 18. After the cargo 18 has been elevated to a level slightly above the bed 14 of the pickup 12, the sliding member 30 is manipulated toward the pickup 12 so as to position the cargo 18 within the bed 14 of the pickup 12. When the cargo 18 is above the desired position, the winch 40 is manipulated to lower the cargo 18 onto the bed 14 of the pickup 12. To unload the cargo 18, the above procedure is merely reversed.

As to a farther discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pickup loading hoist for loading cargo into a bed of a vehicle, comprising:

a frame attachable to said bed of said vehicle, wherein said frame is easily disassembled into a compact storage position;

said frame includes a rail extending substantially horizontally along a longitudinal axis of said vehicle to a finite distance from a rear portion of said vehicle;

an elevating means slidably attached to said rail for engaging said cargo;

wherein said elevating means comprises a winch device; wherein said frame comprises a front frame and a rear frame, wherein said front frame is removably attachable to a pair of stake holders in a central location of said bed and said rear frame includes a coupler member for removably engaging a tubular hitch within said vehicle; and a hitch support device positionable beneath and supporting said tubular hitch while said winch is transporting said cargo into or from said bed of said pickup.

2. The pickup loading hoist of claim 1, wherein said hitch support device comprises:

a base member;

a threaded shaft threadably attached to said base member and projecting vertically; and a plate attached to an end of said threaded shaft opposite of said base member.

3. The pickup loading hoist of claim 2, wherein said front frame comprises a pair of side members parallel to one another and a cross member secured between thereof.

4. The pickup loading hoist of claim 3, wherein said rear frame comprises:

a pair of lower angled members securable at one end to said coupler member and projecting away from one another at an acute angle;

a pair of vertical members attached to said pair of lower angled members opposite of said coupler member; and a pair of upper angled members attached to said pair of vertical members opposite of said pair of lower angled members and engageable to said rail.

* * * * *